(12) United States Patent
Bier

(10) Patent No.: US 8,719,703 B2
(45) Date of Patent: May 6, 2014

(54) SYSTEMS AND METHODS FOR EDITING A WEB PAGE

(75) Inventor: Eric Allan Bier, Mountain View, CA (US)

(73) Assignee: Xerox Corporation, Norwalk, CT (US)

(*) Notice: Subject to any disclaimer, the term of this patent is extended or adjusted under 35 U.S.C. 154(b) by 1687 days.

(21) Appl. No.: 09/731,912

(22) Filed: Dec. 8, 2000

(65) Prior Publication Data
US 2002/0073125 A1 Jun. 13, 2002

(51) Int. Cl.
*G06F 17/00* (2006.01)

(52) U.S. Cl.
USPC ........... 715/255; 715/256; 715/271; 715/272; 715/273

(58) Field of Classification Search
USPC .............. 715/513, 501.1, 511, 552, 530, 200, 715/203, 208, 221, 223, 229, 234, 237, 243, 715/246, 253, 255–256, 272, 212–220, 271, 715/273; 345/733; 705/2, 10; 707/9, 10, 707/102, 200, 201, 203; 709/217, 218, 224, 709/225, 227, 219; 713/202
See application file for complete search history.

(56) References Cited

U.S. PATENT DOCUMENTS

| | | | | |
|---|---|---|---|---|
| 5,040,142 | A * | 8/1991 | Mori et al. | 715/511 |
| 5,689,718 | A * | 11/1997 | Sakurai et al. | 715/205 |
| 5,801,677 | A * | 9/1998 | Obata | 715/857 |
| 5,890,170 | A * | 3/1999 | Sidana | 715/501.1 |
| 5,890,177 | A * | 3/1999 | Moody et al. | 715/511 |
| 5,956,736 | A * | 9/1999 | Hanson et al. | 715/513 |
| 6,067,551 | A * | 5/2000 | Brown et al. | 715/234 |
| 6,067,568 | A * | 5/2000 | Li et al. | 709/223 |
| 6,199,082 | B1 * | 3/2001 | Ferrel et al. | 715/522 |
| 6,240,414 | B1 * | 5/2001 | Beizer et al. | 707/8 |
| 6,343,302 | B1 * | 1/2002 | Graham | 715/501.1 |
| 6,405,224 | B1 * | 6/2002 | Van Der Meer | 715/513 |
| 6,499,031 | B1 * | 12/2002 | Hopmann et al. | 1/1 |
| 6,549,944 | B1 * | 4/2003 | Weinberg et al. | 709/224 |
| 6,594,654 | B1 * | 7/2003 | Salam et al. | 1/1 |
| 6,594,664 | B1 * | 7/2003 | Estrada et al. | 715/826 |
| 6,654,032 | B1 * | 11/2003 | Zhu et al. | 715/753 |
| 6,701,350 | B1 * | 3/2004 | Mitchell | 715/781 |
| 6,745,238 | B1 * | 6/2004 | Giljum et al. | 709/219 |
| 6,985,901 | B1 * | 1/2006 | Sachse et al. | 1/1 |
| 6,988,138 | B1 * | 1/2006 | Alcorn et al. | 709/225 |

OTHER PUBLICATIONS

Randal et al. Using Microsoft FrontPage, published by Que Corporation 1996 whole Document.*

(Continued)

*Primary Examiner* — Chau Nguyen
(74) *Attorney, Agent, or Firm* — Patrick J. S. Inouye; Krista A. Wittman

(57) ABSTRACT

By analyzing a web page, the web page can be divided into component parts. Specifically, the web page can be divided into items, templates and the remaining HTML. Then, using dedicated user interfaces, each component part can be separately edited. To facilitate editing, the component parts not being edited can optionally be suppressed or presented in abbreviated form, and all parts can optionally be shown in the same order in which they occur in the web page. The live version of the web page is then updated with the edited version of the component parts, taking into consideration any contributions from other users made during the editing process.

17 Claims, 12 Drawing Sheets

(56) References Cited

OTHER PUBLICATIONS

Ken Pier et al. PARC WebEdit: Shared Text Editing in a web Brower. http://www.parc.xerox.com/istl/groups/gir/doc/webedit/webedext.htm (hereinafter Pier) published Jan. 1996. Whole document.*

Bay-Wei Chang, "In-Place Editing of Web Pages: Sparrow Community-Shared Documents", Published Apr. 1998, URL: http://www2.parc.com/istl/projects/sparrow/doc/www7/ Whole Document.*

Blogger. http//www.blogger.com/.

Bay-Wei Chang. In-Place Editing of Web Pages: Sparrow Community-Shared Documents. In the proceedings of WWW7, Apr. 1998. On the Web at: http://www7.scu.edu.au/programme/fullpapers/1929/com1929.htm.

Sparrow community shared web pages, http://www.parc.xerox.com/istl/projects/sparrow/, Dec. 6, 2000, pp. 1-6.

DiaryLand get your own fun free web diary! DairyLand 1999, Dec. 6, 2000, pp. 1 of 1.

A growing community of Manila websites. *UserLand Software, Inc.*, 1998-2000. http://www.EditThisPage.com, pp. 1-2.

Jay Glicksman. A Server-Side Editor for HTML. In the poster poster proceedings of the 4th International World Wide Web Conference, pp. 86-87.

Ken Pier, Eric A. Bier, Ken Fishkin, Maureen Stone. Abstract for WebEdit: shared editing in a Web browser. In the poster proceedings of the 4th International World Wide Web Conference, pp. 66-67.

Ken Pier, Eric A. Bier, Ken Fishkin, Maureen Stone—PARC WebEdit: Shared Text Editing in a Web Browser. http://www.parc.xerox.com/istl/groups/gir/doc/webedit/webedext.htm.

pitas.com—the fresh, healthy and delicious home of free, easy to update weblogs, newslogs, all that junk. http://www.pitas.com/.

DevWiki: FrontPage. http://www.devtools.org/servlet/wiki/FrontPage/.

Arturo Crespo and Eric A. Bier. WebWriter: A browser-based editor for constructing Web applications. In the proceedings of WWW5, May 1996, France. http://www5conf.inria.fr/fich_html/papers/P35/Overview.html.

* cited by examiner

```
<!-- SparrowTemplate: Comment -->
<SPARROW BUTTONS="move delete">
<!--
<INPUT TYPE="IMAGE" SRC="/project/sparrow/img/edit.gif"
    NAME="SparrowEdit-0" BORDER="0">
<B><FIELD TYPE="TEXT" NAME="Your name"></B> says:
<BLOCKQUOTE>
<FIELD TYPE="TEXTAREA" NAME="Comment">
</BLOCKQUOTE>
-->
```

```
<!--Item-Comment-4-->
<INPUT TYPE="IMAGE" SRC="/img/edit.gif"
    NAME="SparrowEdit-4" BORDER="0">
<B><!--I--> Joe Shmoe<!--I--></B> says:
<BLOCKQUOTE>
<!--I-->I come from Alabama with my banjo on my
knee.<!--I-->
</BLOCKQUOTE><!--I-->
```

```
<!--Item-Comment-105-->
<INPUT TYPE="IMAGE" SRC="/img/edit.gif"
    NAME="SparrowEdit-105" BORDER="0">
<B><!--I-->Moon Mouse<!--I--></B> says:
<BLOCKQUOTE>
<!--I-->Rather than discuss our differences, let's
concentrate on our similarities. For example,
although I am from the moon, I share you
Earthlings' love of ice cream.<!--I-->
```

▶ Joe Shmoe says:

I come from Alabama with my banjo on my knee.

▶ Moon Mouse says:

Rather than discuss our differences, let's concentrate on our similarities. For example, although I am from the moon, I share you Earthlings' love of ice cream.

Your name: Moon Mouse
Comment:
Rather than discuss our differences,
let's concentrate on our similarities.
For example, although I am from the

[Change] [Cancel]
[Move Up] [Move Down] [Delete]

FIG. 6

```
<HEAD>
Normal HTML header mark-up
<META http-equiv="pragma" content="no-cache">
<!-- SparrowTemplate: title .... -->    ⎫
<!-- SparrowTemplate: todo .... -->     ⎬ 72
</HEAD>                                  ⎭
<BODY>
<FORM action="http://servername/project/sparrow/sparrow.cgi#sparrow"   —76
 method="post">
Normal HTML body mark-up, background colors, tables, etc.
<!--Item-title-1--> ... <!--//-->   —78
Normal HTML
<!--Item-todo-3--> ... <!--//-->    ⎫
<!--Item-todo-4--> ... <!--//-->    ⎬ 78
 ... <!--Item-todo-n--> ... <!--//-->⎭
Normal HTML
<!--Add-todo-1--><input type="image" name="SparrowAddBefore-1" value="AddBefore"   —79
 src="http://.../add.gif" border="0"><!--//-->
</FORM>
</BODY>
```

70 — header section
74 — body section

FIG. 7

▸ To Do List for the Juggling Show

▸ Click on the plus '+' sign to add items to the list. Click on any black triangle to edit the associated item.

▸   9 :  Buy Juggling bean bags *[ Peggy Pickle ]*
▸   9 .  Buy 6 purple juggling clubs. *[ Lorenzo Pickle ]*
▸   8 :  Choose some music for the encore *[ Dill Pickle ]*
+

FIG. 9

▸ To Do List for the Juggling Show

▸ Click on the plus '+' sign to add items to the list. Click on any black triangle to edit the associated item.

▸   9 :  Buy Juggling bean bags *[ Peggy Pickle ]*
▸   9 :  Buy 6 purple juggling clubs. *[ Lorenzo Pickle ]*
▸   8 :  Choose some music for the encore *[ Dill Pickle ]*
+

FIG. 10

▸ To Do List for the Juggling Show

▸ Click on the plus '+' sign to add items to the list. Click on any black triangle to edit the associated item.

▸   9 :  Peggy Pickle *[ Buy Juggling bean bags ]*
▸   9 :  Lorenzo Pickle *[ Buy 6 purple juggling clubs. ]*
▸   8 :  Dill Pickle *[ Choose some music for the encore ]*
+

FIG. 11

SYSTEMS AND METHODS FOR EDITING A WEB PAGE

FIELD OF THE INVENTION

This invention relates to electronic documents. In particular, this invention relates to editing electronic documents that remain group-editable.

BACKGROUND OF THE INVENTION

The Internet makes it possible to make large quantities of information available to anyone with an internet browser. By and large this transfer of information is one-way from the author of a page to a group of internet browser users who have access to the information via a distributed network. Several systems are available that provide web page authors with the means to edit the code, such as HTML, of a web page directly from a web browser. These systems present a page author with a single editing region from which all of the code, e.g., HTML, of the web page is accessible and editable. Upon completion of any edits, the page author saves the updated page to, for example, a web server so that it can again be accessed by users.

The "Sparrow" system described by Bay-Wei Chang in "In-Place Editing of Web Pages: Sparrow Community-Shared Documents," which is incorporated herein by reference in its entirety, allows a shared web page to be modified or added to by any contributor. Specifically, the Sparrow system allows a user to contribute to a web page in ways the page author has defined.

The universal nature of the world-wide web and the Internet makes it a practical platform for collaboration. Internet documents are accessible by a plurality of browsers, and browsers are commonly bundled on almost all computing platforms. However, the Internet does not lend itself to use as a collaborative work environment in which web pages are subject to editing and updating by a plurality of users. Web pages are generally treated as published documents that are owned, edited and made available by the original author.

The Sparrow system demonstrates that it possible to increase the information dissemination capabilities, by providing web pages that are not only viewable by many people, but can have their content modified by multiple people. However, while these web pages can have their content modified by multiple people without a knowledge of a computer language, creation and/or updating of the page that allows for the shared contributions can pose problems.

In the Sparrow system, a traditional HTML page can be made into a group-editable web page by adding several additional strings of HTML syntax, chiefly a set of templates and a set of data contributions or items. The templates describe what information contributions the page may contain, i.e., the number and kinds of data fields, and how those contributions will be formatted. An item is a single contribution, formatted according to the rules in one of the templates. Contributors add new contributions, or edit previous contributions, by filling in forms where these forms require no previous knowledge of HTML. With Sparrow, the page author can change the layout of such a page, or the format of its items, by reading the page into a text editor or HTML authoring tool and making edits to the overall page.

SUMMARY OF THE INVENTION

Group-editable web pages will appeal to the largest audience if they do not require learning a formatting language, such as HTML or XTML, in order to make a contribution. Page authors will have the best chance of maintaining a group-editable web page if they retain some control over the content and layout of contributions. Page authors will also want to be able to update the page layout and format of contributions as they discover errors, receive feedback from users, develop new ideas, and the like. The systems and methods of this invention at least offer audiences and page authors these properties.

However, a page author who wishes to modify the layout of a group-editable web page with the formatting of its contributions must take the web page off-line, read the entire page into a text editor or HTML authoring tool and use the editor or tool to change the overall page, the template, the data items, or some combination of these items. Upon completion of the page changes, the page author can save the page and make the updated version available from a web server, so that readers will again be able to view the web page. However, any contributions made to the page while the page author is modifying the page will either be lost or will need to be merged into the page manually once the page author is done with the modifications. Furthermore, if the page author makes changes to any templates, the page author will then need to update any items that depend on those templates, to ensure that the items remain consistent with the templates. Therefore, if there are a substantial number of items, this leads to a considerable amount of work. Similarly, if the page author makes changes to any items, the page author must make sure that the items remain consistent with the templates. As many parts of an HTML page look similar, it may take the page author a substantial amount of time to find the correct part of the page on which the changes are needed by scrolling through the text editor or the HTML authoring tool. Again, this document can be very long if it contains many items.

With previous web page authoring systems, the page author is presented with a single editable document from which all of the HTML of the page is accessible. The systems and methods of this invention realize that the code of a group-editable web page can be considered in several distinct parts, namely the items, the templates, and the remaining code that is not contributor editable. Furthermore, the systems and methods of this invention recognize that most changes that most page authors might wish to make to a web page can be made by modifying one of these parts of information at a time. For example, a page author may want to change a template, then edit one or more items, and then, for example, make a small change to the code, such as the HTML of the web page that governs the page layout.

Therefore, it is not necessary to display the contents of all parts of a web page at once. By displaying all parts of a web page to the page author for editing, the page author is required to scroll through the code of the page and locate the correct place within a web page at which the edit is to occur. The systems and methods of this invention can provide a user interface that allows a page author to edit each of the three kinds of page elements, e.g., items, templates and formatting code, such as HTML, by suppressing or simplifying the display of the page element(s) not requiring modification. Such selective editing targets a particular type of page element by using a dedicated user interface to access the element.

The exemplary systems and methods of this invention provide tools for group editing of electronic documents. In particular, the tools allow for group editing of web pages. By parsing a web page and locating elements, such as items, templates, and formatting code, such as HTML, within a web page, a user is presented with a user interface that allows for editing of those elements. Furthermore, by performing a check, upon completion of editing of one or more elements within a web page, the updated web page is merged with the "live" version of the web page to incorporate any changes that may have also been made by other users. In this manner, the web page remains live, and changes made to the live group-editable page are not lost.

An information storage media comprising: information that selects one or more portions of an electronic document; information that determines an edit user interface for the one or more selected portions; information that edits the one or more selected portions; and information that replaces the one or more selected portions based on one or more edited portions.

These and other features and advantages of this invention are described in or are apparent from the following detailed description of the embodiments.

BRIEF DESCRIPTION OF THE DRAWINGS

The embodiments of the invention will be described in detail, with reference to the following figures wherein:

FIG. 6 is illustrating an exemplary web page, HTML code and item editing interface;
FIG. 7 illustrates an exemplary HTML web page;
FIG. 9 is a screen shot illustrating an exemplary web page;
FIG. 10 is a screen shot illustrating an exemplary web page;
FIG. 11 is a screen shot illustrating an exemplary web page.

DETAILED DESCRIPTION OF THE INVENTION

Upon creation of a web page through the use of, for example, the "Sparrow" nomenclature, the systems and methods of this invention are capable of analyzing a web page and selecting portions of the web page corresponding to a user's editing selection, while suppressing unnecessary elements. Specifically, a page author selects an element, such as an item, template or the part of the code that defines the overall structure of a web page, such as the rest of the HTML.

Figure 1:
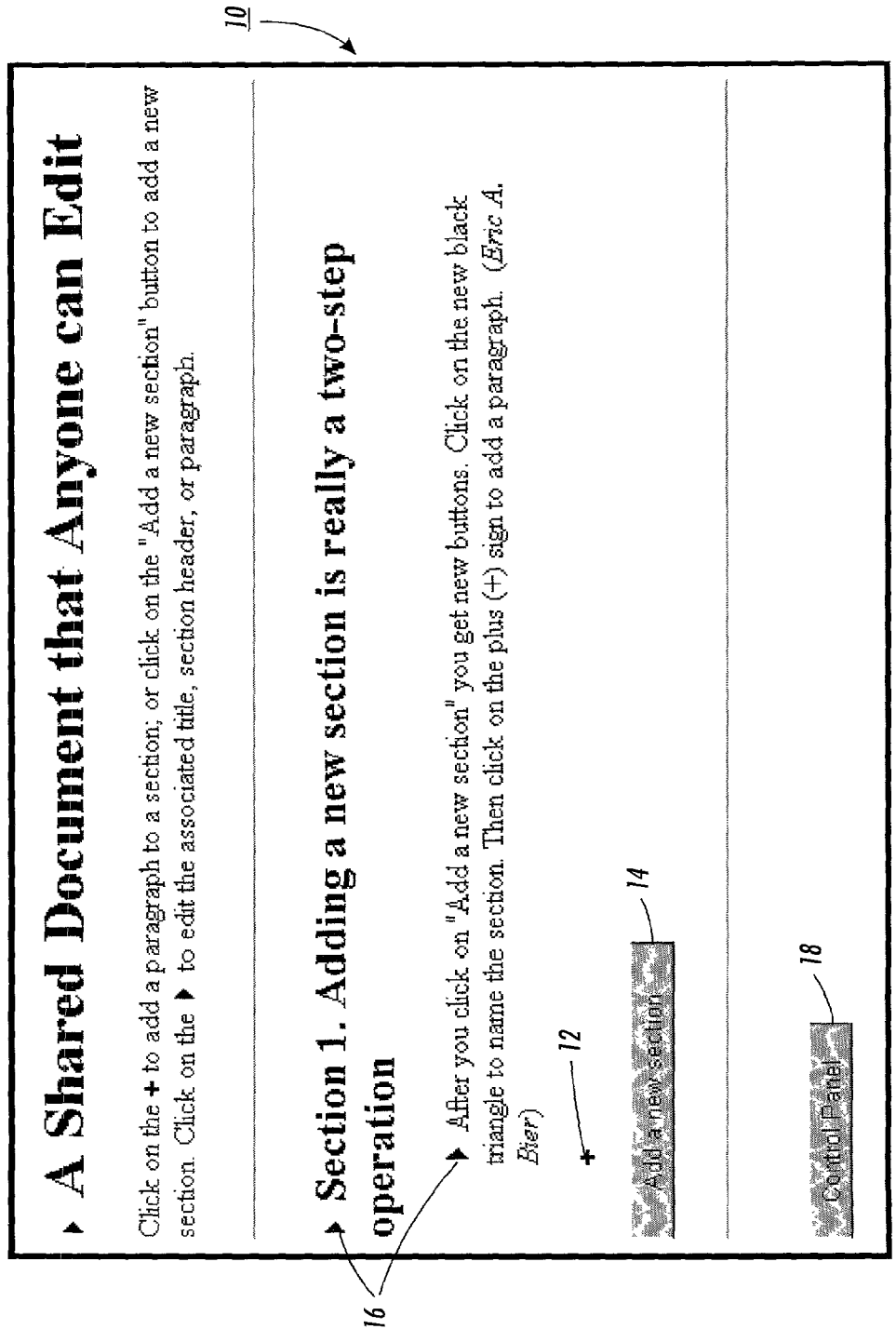
FIG. 1 is a screen shot illustrating an exemplary web page.

FIG. 1 illustrates an exemplary group-editable web page 10 which acts as a shared page for editing the content of a shared document. Specifically, by selecting a specific portion, such as the "+" button 12 within the web page, a user can add a new item to "Section 1." Alternatively, by selecting the "Add a new section" button 14, the user can add a new section to the document. By selecting the "▶" button 16, the user can edit an already existing portion of the document. The above editing features allow users to edit the content of a shared web page. However, if a user, such as a page author, desires to edit, for example, the formatting of the sections, or the font of the comments within a section, an additional interface needs to be present. The systems and method of this invention embed a "Control Panel" button 18 into the shared web page which allows, for example, a page author to access the formatting language of the web page to control the characteristics of the overall page as well as the organization of content within a web page.

Exemplary group-editable web pages that can be used in conjunction with the systems and methods of this invention include, but are not limited to a sortable "to do" list, a meeting scheduler, event logger, talk announcements, project management, URL sharing, co-authoring documents, requesting comments, preparing and managing sign-up sheets, weighted voting, a group home page, or the like.

Figure 2:
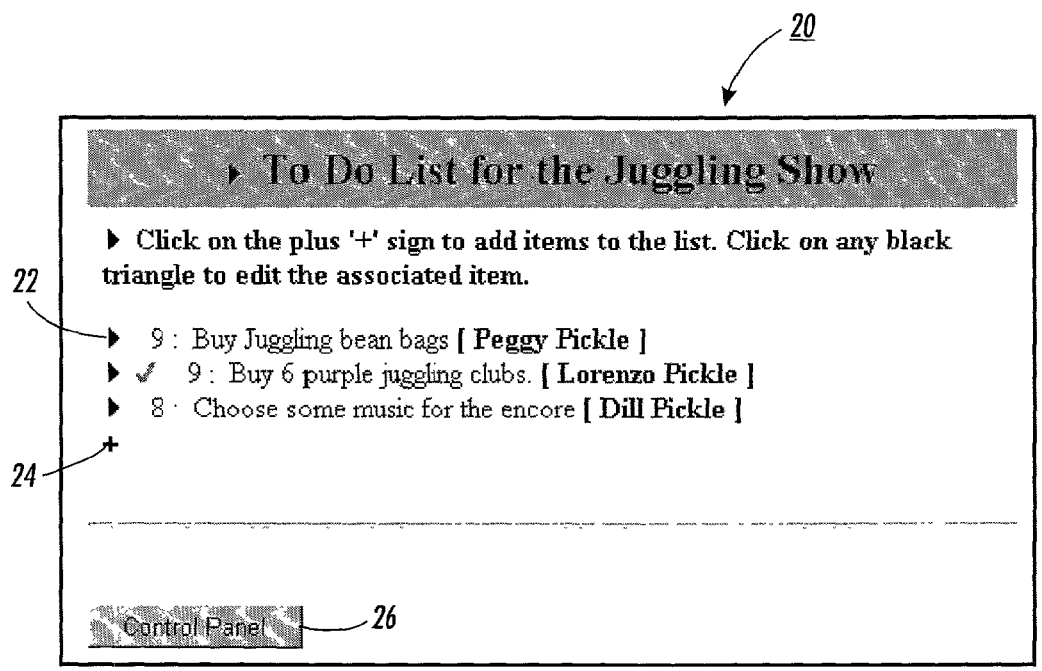
FIG. 2 is a screen shot illustrating an exemplary web page.

FIG. 2 illustrates an exemplary group-editable web page 20. The group-editable web page 20 includes several selectable portions 22-26. In this exemplary embodiment, the selectable portion 22 allows for editing items. The selectable portion 24 allows the user to add a new item. The selectable portion 26 allows a user to edit the overall formatting and regulation of the web page 20.

Figure 3:
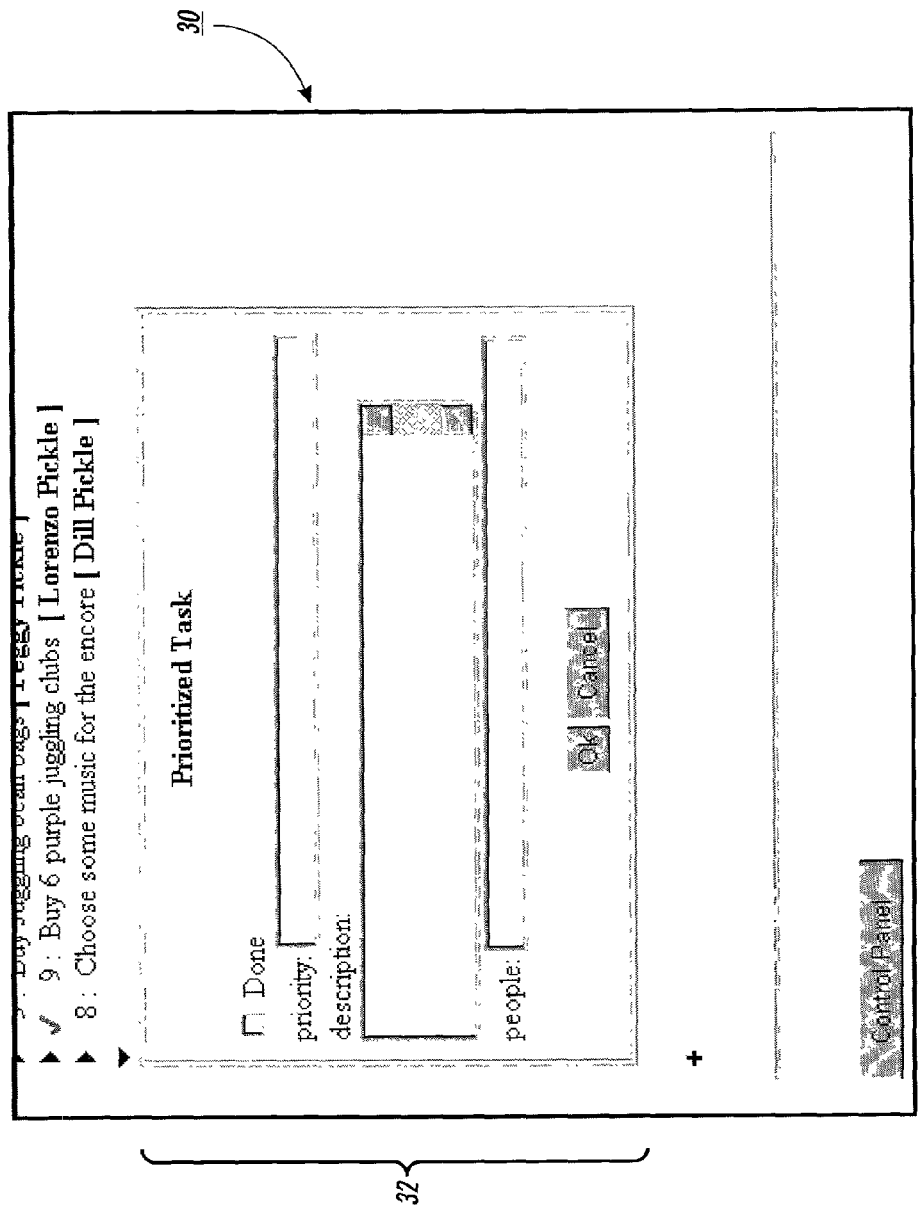
FIG. 3 is a screen shot illustrating an exemplary web page.

A user who desires to contribute to the page by adding a new item would, for example, click on the selectable portion 24. In response the user would receive a new page 30 as illustrated in FIG. 3. The new page 30 looks similar to the original page, however, a blank dialog box 32 appears. The new page 30 can be, for example, automatically vertically centered such that the dialog box is visible in a browser window using, for example, a place holder identifier, such as an anchor tag. Thus, to add content, the user supplies the dialog box 32 with the desired information and selects the "OK" button 34 upon completion of the additions. The information contained in the dialog box 32 is then merged with the original web page such that the new information is added, for example, adjacent to the selectable portion 24.

Figure 4:
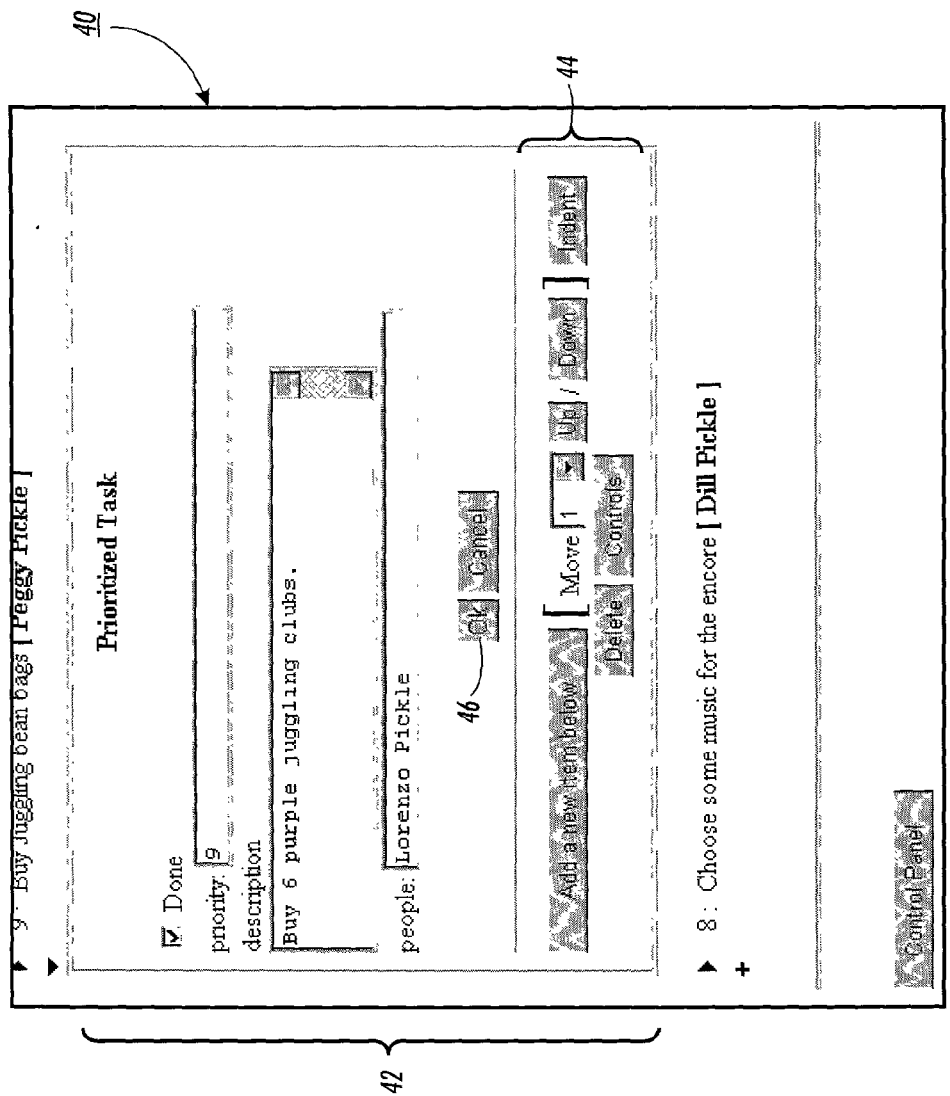
FIG. 4 is a screen shot illustrating an exemplary web page.

Similarly, a user wishing to modify an existing item can click on the selectable portion 22. The selectable portion 22 is associated with a corresponding item. Again, upon selection of a selectable portion 22, a new web page 40, as illustrated in FIG. 4, is generated and forwarded to a user. The new web page 40 can look similar to the original page 20, except that the item to be edited can be replaced by a dialog box 42. Therefore, the dialog box 42 appears in the place of the item being edited. The additional buttons 44 can be included in the dialog box 42 that allows further editing of an item, such as, moving an item, deleting an item, indenting an item, adding a new item below the current item, or the like. Upon completion of the edits, a user selects the OK button 46, for example, with the click of a mouse, at which time the web page residing on the web server is updated.

For a user to edit the overall formatting of a page, an additional interface that allows access to the formatting code of a web page needs to be provided. For example, by selecting the "Control Panel" button 18, access to this interface is provided.

Figure 5:
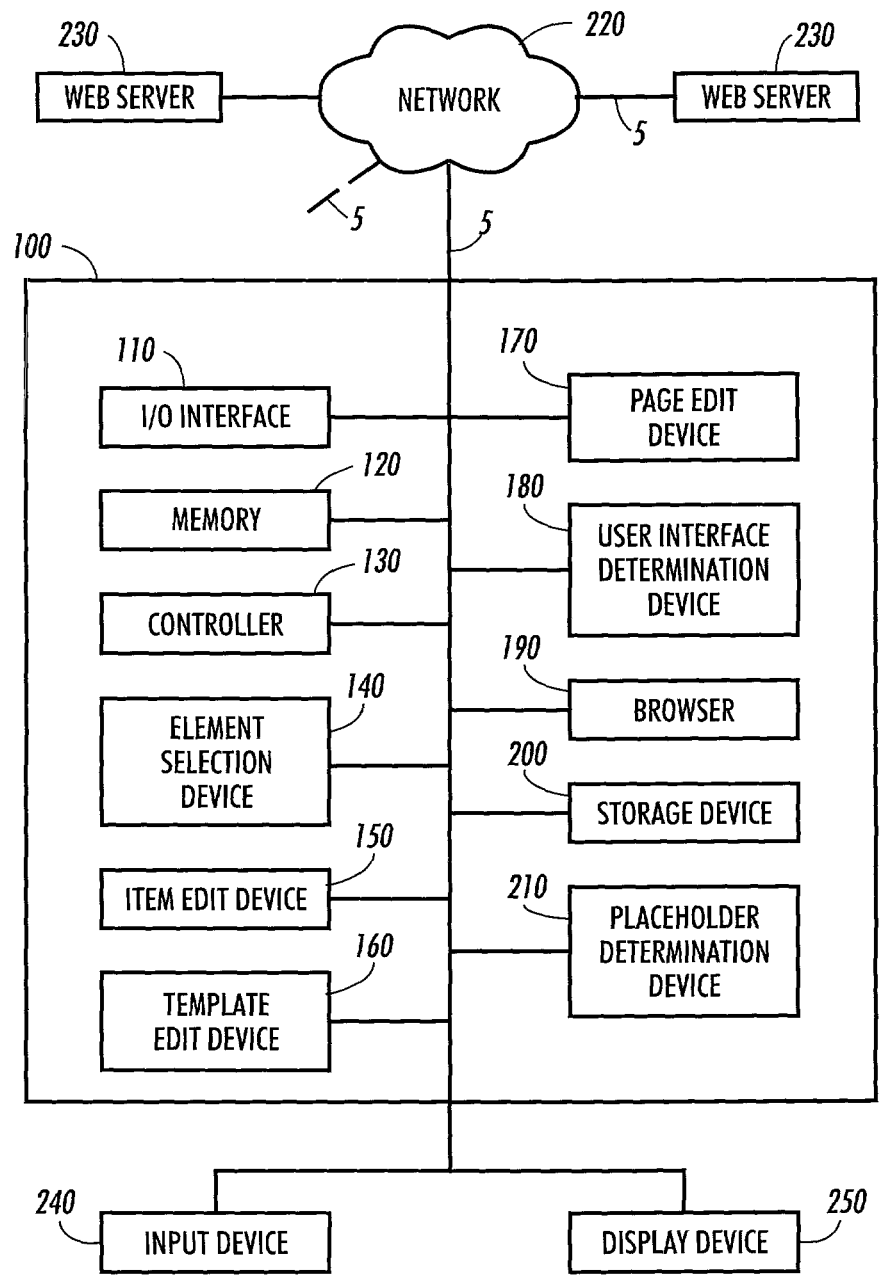
FIG. 5 is a functional block diagram illustrating an exemplary selective editing system according to this invention

FIG. 5 illustrates an exemplary selective editing system 100. The selective editing system 100 comprises an I/O interface 110, a memory 120, a controller 130, an element selection device 140, an item edit device 150, a template edit device 160, a page edit device 170, a user interface determination device 180, a browser 190, a storage device 200 and a placeholder determination device 210, interconnected by links 5. The selective editing system 100 is also connected to at least one distributed network 220 which may or may not also be connected to one or more other distributed networks and web servers 230. Furthermore, the selective editing system 100 is connected to one or more input devices 240 and display devices 250.

While the exemplary embodiment illustrated in FIG. 1 shows the selective editing system 100 and associated components collocated, it is to be appreciated that the various components of the selective editing system 100 can be located at distant portions of a distributed network, such as a local area network, a wide area network, an intranet and/or the internet or within a dedicated selective editing system. Thus, it should be appreciated that the components of the selective editing system 100 can be combined into one device or collocated on a particular node of a distributed network. As will be appreciated from the following description, and for reasons of computational efficiency, the components of the selective editing system can be arranged at any location within a distributed network without affecting the operations of the system. For example, the selective editing system 100 can be arranged with the browser 190, input device 240, display device 250 and associated controller, I/O interface and storage components on a personal computer, and the various editing systems, element selection device, user interface determination device, controller, memory, I/O interface and placeholder determination device located on, for example, a web server.

Furthermore, the links 5 can be a wired or wireless link or any known or later developed element(s) that is capable of supplying and communicating electronic data to and from the connected element(s). Additionally, the input device 210 can be a keyboard, a mouse, speech to text converter, or the like. The display device 220 can be a computer monitor, a display on a PDA, or any other device capable of displaying information to one or more users.

In operation, a user, via input device 240, and with the cooperation of the I/O interface 110, the memory 120, the controller 130 and the browser 190, requests one or more web pages from web servers 230. In particular, a user can, for example, enter a URL which retrieves a specific web page from the web server 230. If the retrieved web page is group-editable, a user then has the option of editing one or more of the items, templates, or overall HTML associated with defining, for example, the layout and overall formatting of the web page.

For example, if a user desires to edit an item within a web page, a user, via browser 190 retrieves a web page from web server 230. Then, upon selection of an clickable portion of an item within the web page, via, for example, the input device 240, the placeholder determination device 210 forwards a temporary page to the browser containing an edit point identifier, such as an anchor tag, indicating where the item is located and a dialog box displaying the editable content of the item. A user can then, for example, with the cooperation of the input device 240 and the item element device 150 edit, modify, or add new item information to the editable HTML form fields of the temporary page. Upon completion of all edits and/or updates, the item edit device 150, in cooperation with the I/O controller 110, the memory 120, the controller 130 and link 5, updates the original web page on web server 230 accounting for other edits and/or additions other users may have made. For example, the item edit device 150 determines if the web page on the server is locked. If the web page is locked, the item edit device 150 waits for the web page to be unlocked, locks the web page itself and reads the latest copy of the web page into memory. The element selection device 140 then locates the old item in the latest copy of the web page. The item edit device 150 deletes the old item and replaces it with the updated item. The web server is then updated with the new item and the web page unlocked so that any contributions stored in a queue while the web page was locked may be processed.

Alternatively, if a user desires to edit one or more templates within a web page, a user initiates a template edit mode. As with the item edit mode, one or more web pages have been retrieved and displayed, for example on browser 190, and stored in storage device 200 or the memory 120, a cache (not shown), or the like. To edit a template, a user initiates the template edit mode of the template edit device 160. The template edit device 160, in cooperation with the element selection device 140, parses the web page to determine the one or more templates in use. Upon determination of the templates in use, the element selection device 140 also determines which items are associated with the one or more identified templates. Upon selection of all elements, and identification of the items associated with those elements, the template edit device 160 creates and forwards a temporary web page to the browser 190 which allows for editing of the template. Alternatively, in, for example, an administrative mode, all pages can be populated with the "Control Panel" button allowing a page author direct access to the various editing modes. A user then edits, for example, with the input device 240, the template. Upon completion of the edit, the template edit device 160 verifies the syntax of the template. If the syntax is acceptable, the updated template is temporarily stored. Otherwise the template edit device 160 generates a message for display on the display device 220 indicating that there is a syntax error.

Next, the template edit device 160 determines if the web page is locked. If the web page is locked, for example by another user, the template edit device 160 waits for the web page to unlock. Once the web page is unlocked, the template edit device 160 locks the web page and reads the latest copy of the web page into memory. Next, the element selection device 140 locates the old template in the latest copy of the web page. This old template is then deleted and replaced by the new template in the same location. The template edit device 160 then compares the new template with the original template. If field tags have been removed from the edited template, a determination is made whether the data fields associated with the deleted field(s) should be discarded. If the data fields are to be discarded, the template edit device 160 deletes the data fields. However, if for example, a user did not previously select the "OK, delete fields enabled" button, the web page is unlocked and the user is requested to select a new template.

The template edit device 160 then updates each item on the page associated with the edited template and temporarily saves the web page. The template edit device 160 updates the web server, unlocks the web page and processes any contribution that may have accumulated in the queue.

Additionally, as previously discussed, a user can edit the overall characteristics, such as formatting characteristics, of the page in the page edit mode. Specifically, the page edit mode is initiated in response to a user request with the aid of the page edit device 170. As before, a user has requested a web page which is retrieved, for example, from the web server 230 and displayed on the browser 190. Upon selection of the page edit mode, the page edit device 170, in cooperation with the element selection device 140 and the placeholder determination device 210 optionally prompts the user for an indication as to which items should be suppressed in the page edit mode. Specifically, the page edit device 170, in cooperation with user interface determination device 180, prepares a set of user interfaces querying the user as to whether the items should be suppressed, whether the white space between items should be made editable by adding an HTML text area between items, and whether the template content should be suppressed. Upon a user selecting one or more suppression and/or make editable techniques, the page edit device 170 in cooperation with the element selection device 140 and the placeholder determination device 210 parses the web page and replaces the suppressed items with placeholder identifications in a temporary page. Next, the element selection device 140 selects the non-placeholder information, defining, for example, the global characteristics of the web page. The user interface determination device 180, in cooperation with the page edit device 170, then assembles a page edit user interface having an edit area defined for each non-placeholder portion. A user is then allowed to perform edits on this remaining HTML. Upon completion of the page edits, the page edit device 170 determines if the web page is locked. If the web page is locked, the page edit device 170 waits until it is unlocked. Once unlocked, the page edit device 170 locks the web page and reads the latest copy of the web page into memory. Next, the old non-placeholder portions are located by the element selection device 140. The page edit device 170 then deletes the old non-placeholder portions and replaces them with the updated non-placeholder portions. Each item associated with the updated non-placeholder portions are then updated and the web page saved to a temporary file. The web server is then updated, the web page unlocked and any contributions made by other users within the queue processed.

The systems and methods of this invention allow the content of a single template to be visible and editable, while continuing to display the original page. Then, once a page author has finished editing the template, the new template is stored in the original file that constitutes the web page and all data items based on that template are updated to be consistent with the updated template. To illustrate the operation of a template, FIG. 6 outlines the correlation between a template and item information.

Specifically, FIG. 6 illustrates an exemplary portion of a web page 60 with two contributor's items 63 and 65 and associated template definition 62 and an edit item dialog box 64 for the second contributor item 65. The exemplary template definition 62 includes a special instruction portion 66 that directs the system to provide buttons in the edit template dialog box 64 for sorting, moving, deleting, or the like. A formatting portion 68 of the template definition 62 defines the formatting of the items illustrated in the web page 60, including standard HTML plus the <FIELD> tags that identify the various contributor editable data fields of the items. The portions 67 and 69 define how an item appears as HTML, and shows the item fields beginning with the "+" sign and ending with the "/" sign. Thus, the selective editing system identifies the parts contributed by a user and the names of the fields need not be repeated in each item since the order of fields in the item corresponds to the order in the template.

FIG. 7 illustrates an exemplary web page broken down into its respective elements, or element identifiers. Specifically, the web page includes a head portion 70 comprising identifiers for two templates 72. Additionally, the web page contains a body portion 74 comprising a form identifier that calls a CGI script that allows for group-editing of the page, item identifiers 78, and a button definition section 79 that allows, for example, adding of a to-do list element in this exemplary embodiment. Knowing this overall structure of a page, the selective editing system 100 is able to identify the various components of a web page, and then selectively display portions for editing. However, it is to be appreciated that while the exemplary embodiments have been described in relation to HTML and web pages, the systems and methods of this invention can be applied to any electronic document or computer language comprising identifiable portions that can be selected for editing, such as, the HTML family of languages, XML, or the like, and that has the capability of having textual comments included in the source that are invisible to the reader of the document.

Figure 8:
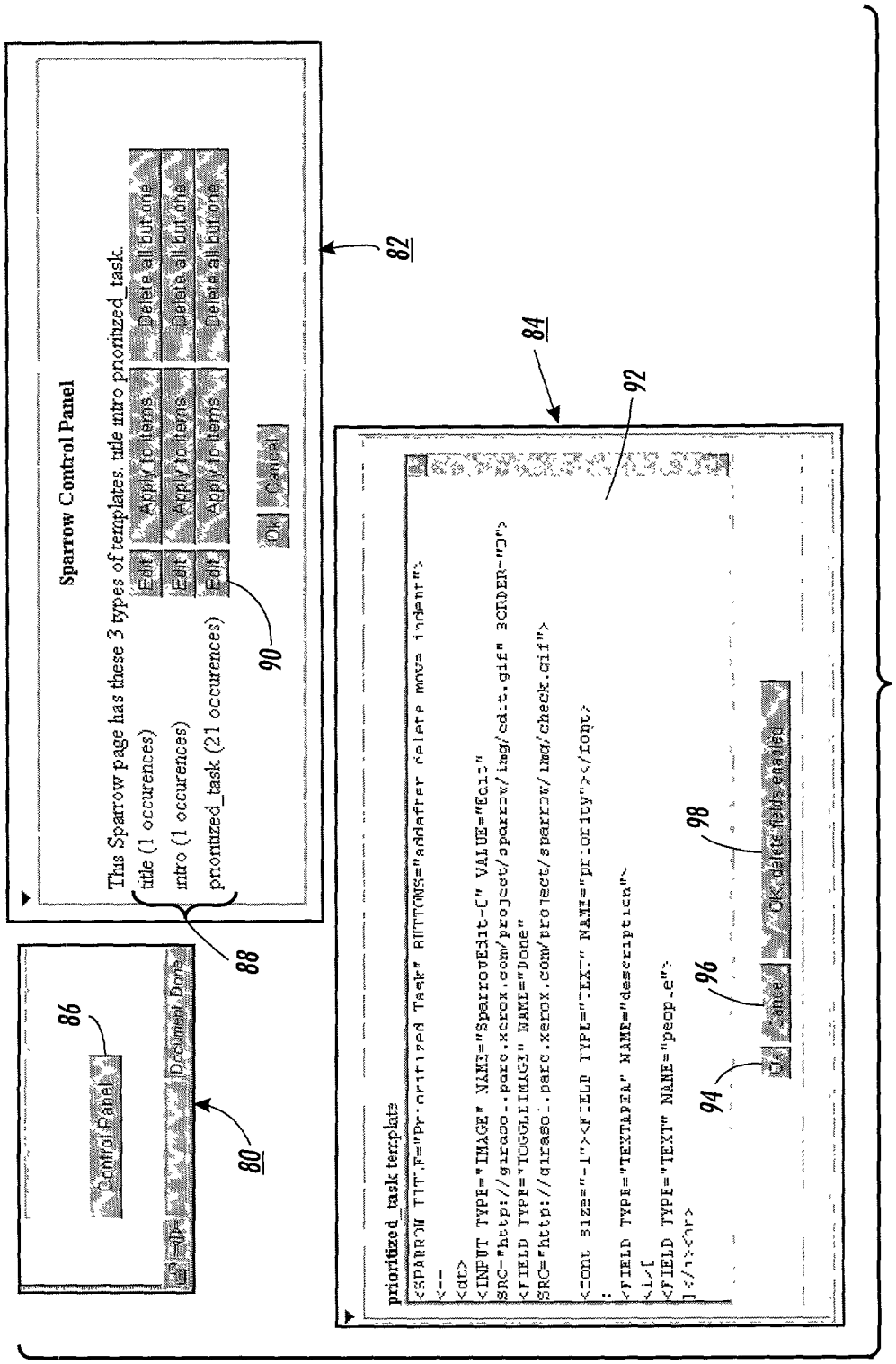
FIG. 8 is a screen shot illustrating exemplary user interfaces.

FIG. 8 illustrates exemplary portions of user interfaces 80-84 that can be displayed on display device 220 during editing of a template. In particular, as previously discussed, a group-editable web page 80 can include a control panel button 86. This Control Panel button 86 can be always present, present in an administrative type mode, or can be added by the user interface determination device 180 upon a user indicating through some other means that editing of a template is desired. Upon selection of the control panel button 86, the control panel user interface 82 is determined by the user interface determination device 180 in cooperation with the element selection device 140 and displayed. The control panel user interface 86 allows a user to edit the template within the web page. Note that in this exemplary embodiment, the information pertaining to the specific items in the overall page HTML are present above and below the control panel 82 but have been omitted to conserve space.

Specifically, upon selecting the control panel button 86, the template edit device 160 determines a new HTML page that is forwarded to the browser 190. The new page looks similar to the original page except that an additional dialog box, the control panel 82, replaces the control panel button 86. The control panel 82 lists the names of all the templates 88 that are currently in use in the web page. In this example, there are three templates 88 named "title," "intro" and "prioritized_task." For each template 88, the control panel 82 optionally also displays the number of items that are based on that template. Therefore, to edit a particular template, a user selects, for example, with the click of a mouse, the "Edit" button 90 adjacent to the name of that template. Upon selection of the edit button 90, the template edit device 160 responds by determining another web page for forwarding to the browser 190. This new web page no longer displays the control panel 82, but instead displays a page that looks exactly like the original web page except that a new dialog box is inserted within the page to be used for editing the template. This new dialog box is referred to as the template editing dialog box 84 and includes a code area 92 containing the actual HTML code of the template, and, for example, "OK," "Cancel," and "OK, delete fields enabled" buttons 94-98 that allow for accepting edits without deletion of fields, canceling edits and accepting of edits that include deletion of fields, respectively.

The first part of the template consists of a <SPARROW . . . > tag. The attributes of this tag are parameters that define what operations will be provided in the item editing dialog box that will appear when the user edits an item based on this template. In this illustrative example, the page author specifies that the title "Prioritized Task" will appear at the top of such an item edit dialog box. The BUTTONS attribute lists those buttons that will be provided at the bottom of an item editing dialog box. In this illustrative example, buttons for adding another item after this item, deleting this item, moving this item up or down in the item order, or indenting this item are provided.

The second part of the template is a string of code, such as HTML, describing how an item based on this template will appear. In addition to the normal set of HTML tags, this string may also include the <FIELD> tag. Each field tag represents an element of information that will be provided by the user when an item based on this template is added to the page. The TYPE attribute of the field tag regulates, for example, the type of information that a user will be asked to provide, the type of form elements a user will be given to provide this information, such as type-in fields, text areas, pull-down menus, check boxes, or the like, and how the information will be formatted once the item has been added.

Thus, the page author can edit either or both of the two separate parts of this template. Once the page author has completed editing, the page author presses the OK button 94. The template editing device 160 then examines the new template to make sure it obeys the syntax for templates. If the syntax is acceptable, the new template is written to a temporary file. Then, the template edit device 160 updates all the items on the page that are based on the revised template. However, if one or more <FIELD> tags are missing from the revised template that were present in the original template, the template editing device 160 will not immediately update all the items to reflect the new template. Instead, the template editing device 160 will prompt the user to confirm that it is acceptable to discard any information stored in the items that belong to the deleted template field. If the user confirms that this loss of information is intended, the items will be deleted. To expedite this procedure, the user may click on the button 98 to save a new template and update all related items, in a case where the user does intend for data to be lost.

For example, the template illustrated in user interface 84 can generate exemplary items like those illustrated in FIGS. 9-11. Specifically, FIG. 9 illustrates an exemplary group-editable web page with three items based on the template illustrated in user interface 84. However, if, for example, the template 92 is edited, by adding bold tags before and after the field tag with the name "description," a revised group-editable web page will be displayed as illustrated in FIG. 10. Furthermore, it is also possible to change the order of the user-supplied data in each item. For example, if a page author edits the "prioritized_task" template 92 by swapping the position of the field tag with the name "people" and the position of the field tag with the name "description" the template edit device 160 will reorder these fields and all the corresponding items in the page. A result will be a group-editable web page as illustrated in FIG. 11.

Additionally, the template edit device 160 is able to swap the contents of the data fields even though template edit device 160 does not include the names of these fields in the contributed items on the page. This is possible because, at the moment that the user selects the "OK" button, the template edit device 160 has access to both the old and new version of the template. Comparing them, the template edit device 160 can see that the order of some of the data fields has changed in the template and then the template edit device 160 can update all the items based on that template accordingly. If the page author were editing this template manually, the page author would also have to manually swap the data in all of the associated items which could potentially be a very time consuming process.

In addition to the above, the page author can also add new fields to a template. In this case, all existing items based on that template on the page will receive default data for the newly added data field. Furthermore, the template editing device 160 allows for a renaming of fields, renaming of templates, or the like.

In an exemplary embodiment, the selective editing system 100 uses a CGI script to implement the above methods. This CGI script uses the same file locking and waiting strategy for both kinds of editing. Thus, it is possible for the page author to modify an item template at the same time that the contributor is adding or editing items to a page. Thus, web pages that use the template editing technique described in accordance with the exemplary systems and methods of this invention can remain "live" to contributors, even while item templates or the overall HTML is being modified or updated.

The page edit device 170 allows a page author to edit the HTML that provides or governs the overall structure or characteristics of a page, including the contents of the HEAD tag, such as a title of a page, the FORM tag, the BODY tag, which includes, for example, background color, any TABLE tags used to position group-editable items on a page, or the like.

As with the template editing mode, the page editing mode selectively displays the HTML portions of the page to facilitate editing and/or updating. Therefore, the page edit device 170 divides the web page into separate-identifiable smaller HTML strings and displays each of the strings in its own scrollable editing area. Thus, once a page author has identified the correct editing area, very little scrolling or navigation will be needed. Furthermore, the page editing device 170 parses a page in such a way that breaks are made at natural points in the HTML coding. For example, in an exemplary embodiment, the HTML corresponding to the group-editable templates and the group-editable items is not provided in the HTML editing area. Instead element identifiers are substituted for these portions. As a set of group-editable items usually comprises most of the HTML content of a group-editable page, suppressing the items greatly reduces the amount of HTML in which a page author must search to perform edits to the overall page defining HTML. To achieve this, small strings of text, or identifiers, that act as place holders for the group-editable templates and the group-editable items are included in the edit main page user interface as "signs" to help guide the page author to the correct editing area. Furthermore, to facilitate easier editing, the page editing device 170, in cooperation with the user interface determination 180, can, for example, size each of the text areas corresponding to the overall structure HTML such that the text areas are large enough to display all of the HTML content with little or no scrolling. For example, in FIG. 12 editing area 2 is taller than editing area 1, and much taller than editing area 3. Using this approach, a page author can quickly find the correct place in the HTML to make a change.

Figure 12:
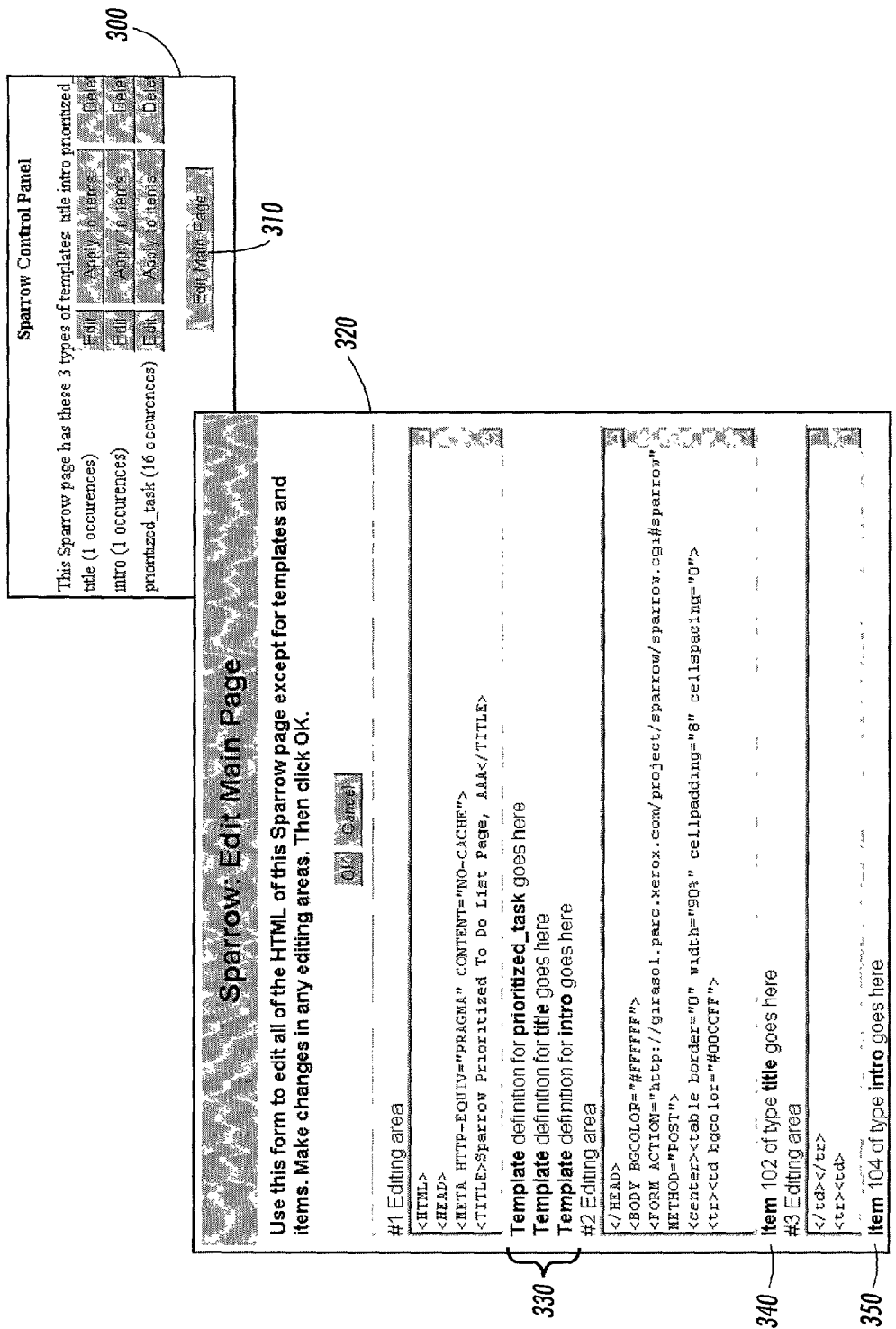
FIG. 12 is a screen shot illustrating an exemplary user interfaces according to this invention.

For example, in the page edit mode, a page author could use the control panel 300 as illustrated in FIG. 12. However, in this instance, the page author would click on the "edit main page" button 310. If this is done for the exemplary group-editable web page, the edit main page user interface 320 is displayed.

In this particular example, the edit main page user interface 320 has five editing areas, numbered 1-3 (editing areas 4-5 are not shown). Editing area 1 contains the HTML, HEAD, META, and TITLE tags of the page. Following editing area 1, text that acts as place holders 330 for three group-editable templates is shown. Then, editing area 2 contains the END HEAD, BODY and FORM tags, along with other tags used to format the page. Following editing area 2, a place holder 340 for an item based on the "title" template is present. Editing area 3 contains various tags to end one row of the table and begin a new one. Following editing area 3 is a place holder 350 for an item based on the "intro" template where, for example, an introductory paragraph will be placed on the actual web pages seen by a user in a browser.

Figure 13:
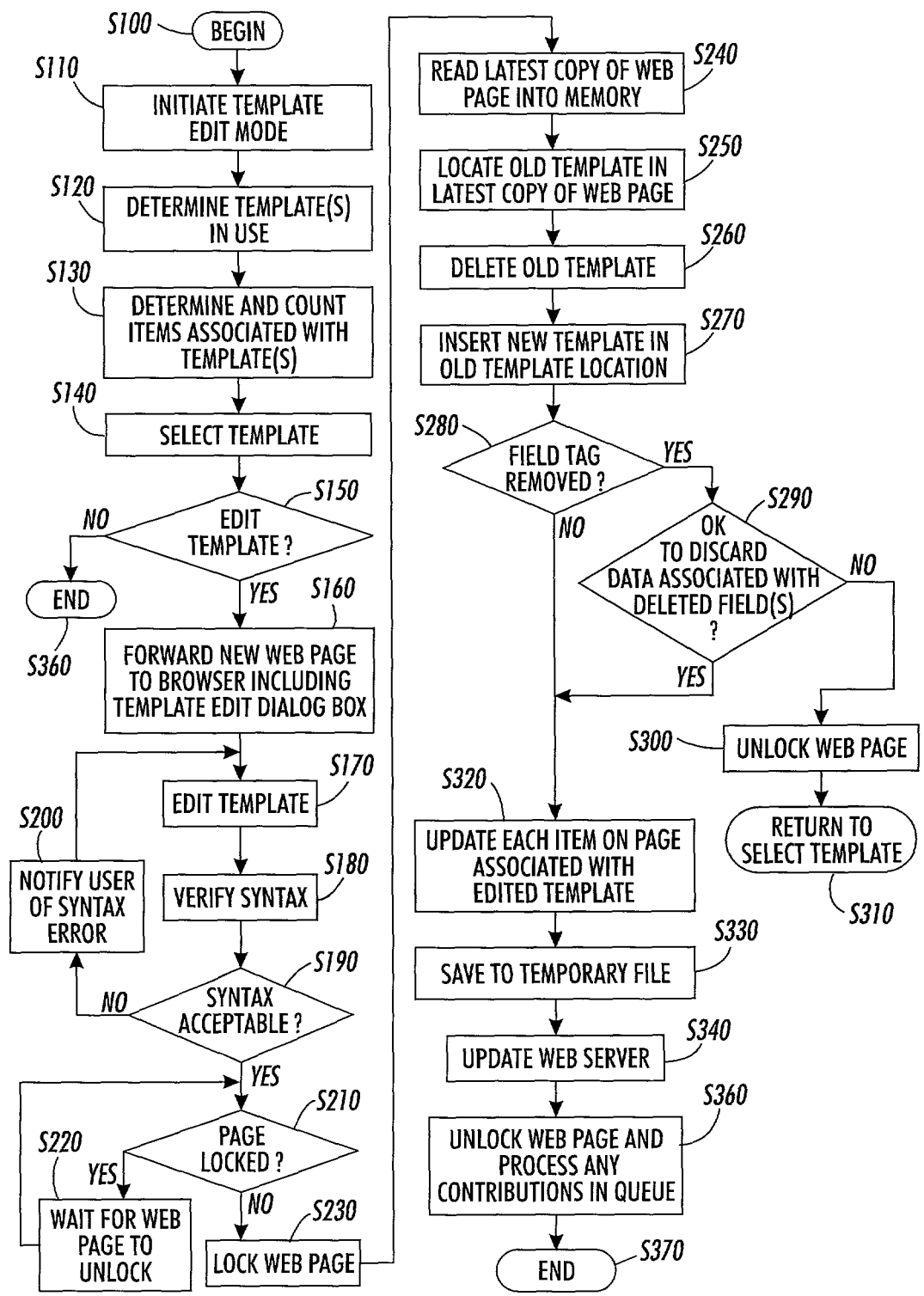
FIG. 13 is a flow chart outlining an exemplary method for editing a template according to this invention.

FIG. 13 outlines a flowchart outlining an exemplary embodiment for editing templates. In particular, control begins in S100 and continues to S110. In S110, the template edit mode is initiated. Next, in S120, the templates currently in use are determined. Then, in S130, the items associated with the templates are determined and counted. Control then continues to S140.

In S140, a template is selected. Then, in S150, a determination is made whether the template is to be edited. If the template is to be edited, control continues to S160. Otherwise, control jumps to S360 where the control sequence ends.

In S160, a new web page is forwarded to the browser of the user including a template editing dialog box for the selected template. Next, in S170, the template is edited in the browser by the user. Upon completion, the edited template is sent to the template editing device, for example, using the HTTP post method. Then, in S180, the syntax of the template is verified. Control then continues to S190.

In S190, a determination is made whether the syntax is acceptable. If the syntax is acceptable, control jumps to S210. Otherwise, control continues to S200 where the user is notified of the syntax error. Control then continues back to S170.

In S210, a determination is made whether the web page is locked. If the web page is locked, control continues to S220. Otherwise, control continues to S230. In S220 the system waits for the web page to unlock. Control then continues to S230.

In S230, the web page is locked for the exclusive use of the editing process. Then, in S240, the latest copy of the web page is read into memory. Control then continues to S250.

In S250, the old template in the latest copy of the stored web page is located. Next, in S260, the old template is deleted. Then, in S270, the new template is inserted in the same location as the old template. Control then continues to S280.

In S280, a determination is made whether a field tag has been removed. If a field tag has not been removed, control jumps to S320. Otherwise, control continues to S290.

In S290, a determination is made whether the data associated with a deleted field is to be discarded. If the data is to be discarded, control continues to S320. Otherwise, control jumps to S300. In S300, the web page is unlocked. Control then continues to S310 where control return to S140.

In S320, each item within the web page associated with the edited template is updated. Next, in S330, the web page is temporarily saved. Then, in S340, the web server is updated by placing the new version of the web page on the server which can then be accessed by users. Control then continues to S350.

In S350, the web page is unlocked and any user contributions that may have accumulated in the queue while the web page was locked are processed. Note that the web page will generally only be locked for a short period of time. Control then continues to S360 where the control sequence ends.

Figure 14:
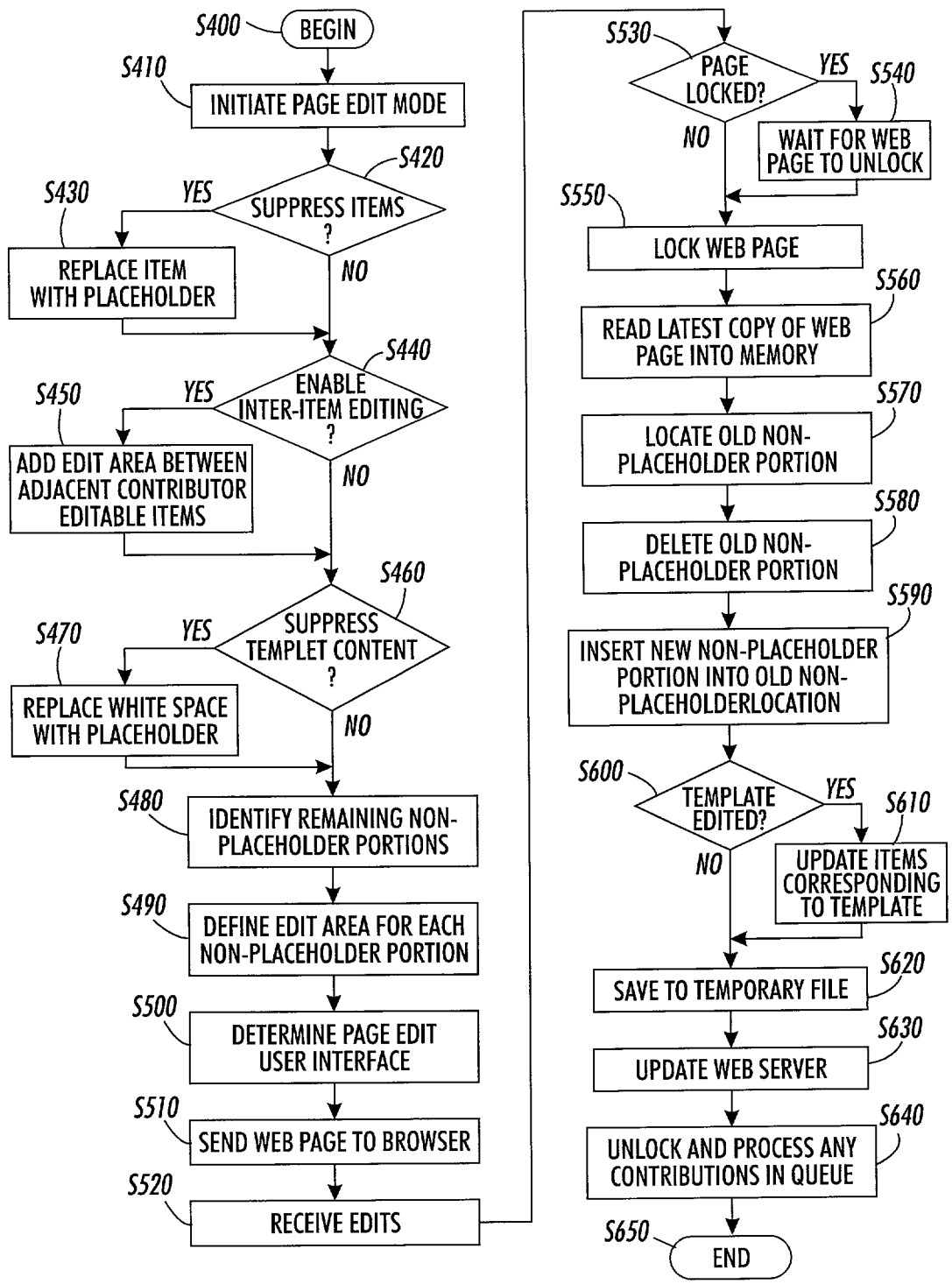
FIG. 14 is a flow chart outlining an exemplary method for editing a page according to this invention.

FIG. 14 is a flowchart outlining an exemplary embodiment for editing a page. In particular, control begins in S400 and continues to S410. In S410 the page edit mode is initiated. Next, in S420, a determination is made whether to suppress items. If items are to be suppressed, control continues to S430. Otherwise, control jumps to S440. In S430 the items are replaced with place holders and control continues to S440. However, the full formatted items could optionally be displayed.

In S440, a determination is made to enable inter-item editing. If inter-item editing is selected, control continues to S450. Otherwise, control continues to S460. In S450, an edit area is inserted between adjacent contributor editable items. Control then continues to S460.

In S460, a determination is made whether to suppress template content. If template content is to be suppressed, control continues to S470. Otherwise, control jumps to S380. In S470, the to be suppressed template content is replaced with place holders and control continues to S480.

In S480, the remaining non-placeholder portions are identified. Next, in S490, an edit area for each non-placeholder portion is defined. Then, in S500, the page edit user interface is determined. Control then continues to S510.

In S510, the web page is sent to the browser. Next, in S520 the edits are received by the page edit device, via, for example, the HTTP post method. Then, in S530, a determination is made whether the web page is locked. If the web page is locked, control continues to S540. Otherwise, control jumps to S550.

In S540, the system waits for the web page to be unlocked. Control then continues to S550.

In S550, the web page is locked. Next, in S560, the latest copy of the web page is read into memory. Control then continues to S570.

In S570, the old non-placeholder portions in the latest copy of the web page are located, where the portions are, for example, contiguous strings containing no placeholders. Next, in S580, the old non-placeholder portions are deleted. Then, in S590, the updated non-placeholder portion is inserted in the same location as the old non-placeholder portion. Control then continues to S600.

In S600, a determination is made whether a template has been edited. If a template has been edited control continues to S610. Otherwise control jumps to S620. In S610, the items corresponding to the edited template are updated. Control then continues to S620.

In S620, the web page is saved to a temporary file. Then, in S630, the web page on the web server is updated with the edited page. Next, in S640, the web page is unlocked and any user contributions that may have accumulated in the queue while the web page was locked are processed. Control then continues to S650 where the control sequence ends.

As shown in FIG. 5, the selective editing device can be implemented either on a single program general purpose computer, or a separate program general purpose computer. However, the selective editing device can also be implemented on a special purpose computer, a programmed microprocessor or microcontroller and peripheral integrated circuit element, an ASIC or other integrated circuit, a digital signal processor, a hardwired electronic or logic circuit such as a discrete element circuit, a programmable logic device such as a PLD, PLA, FPGA, PAL, or the like. In general, any device capable of implementing a finite state machine that in turn is capable of implementing the flowcharts illustrated in FIGS. 13-14 can be used to implement the selective editing device according to this invention.

Furthermore, the disclosed method may be readily implemented in software using object or object-oriented software development environments that provide portable source code that can be used on a variety of computer or workstation hardware platforms. Alternatively, the disclosed selective editing device may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or micro computer systems being utilized. The selective editing systems and methods illustrated herein however, can be readily implemented in hardware and/or software using any known or later-developed systems or structures, devices and/or software by those of ordinary skill in the applicable art from the functional description provided herein and with a general basic knowledge of the computer arts.

Moreover, the disclosed methods may be readily implemented as software executed on a programmed general purpose computer, a special purpose computer, a microprocessor, or the like. In these instances, the methods and systems of this invention can be implemented as a program embedded on a personal computer such as a Java® or CGI script, servlet, as a resource residing on a server or graphics workstation, as a routine embedded in a dedicated selective editing device, a web browser, an electronic message enabled cellular telephone, a PDA, a web server, or the like. The selective editing device can also be implemented by physically incorporating the system method into a software and/or hardware system, such as the hardware and software systems of a graphics workstation or dedicated web page editing/authoring system.

It is, therefore, apparent that there has been provided, in accordance with the present invention, systems and methods for editing web pages. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A group-editable web page editing system, comprising:
    a set of user interfaces to query a user as to items to be suppressed for editing formatting characteristics of a web page comprising a control panel that lists names of all templates currently in use on the web page and for each template displaying a number of items associated with that template;
    an element selection device adapted to parse the web page, to receive a selection of suppressed items from the user, and to replace each of the suppressed items with a placeholder identification in a temporary web page;
    an editing hardware device adapted to identify items not suppressed in the web page, wherein each non-suppressed item is associated with an edit area in a further temporary web page, and to receive edits from the user in one or more of the edit areas in the further temporary web page;
    a format edit device to receive a selection of one of the templates in the control panel from the user, to provide a further web page to the user comprising a dialog box for editing the selected template, and to receive edits to the selected template; and
    a template edit merging device that merges the edits of the temporary web page, the further temporary web page, and the further web page into the web page.

2. The system of claim 1, further comprising:
    an updating device to account for one or more edits by other users.

3. The system of claim 2, wherein the one or more edits by other users are stored in a queue.

4. The system of claim 1, further comprising:
    an updating device to update the non-suppressed items dependent on the edit areas.

5. The system of claim 1, wherein the formatting characteristics comprise at least one of text, images, and formatting codes editable by one or more authorized users, and wherein the formatting characteristics are distinct from editable content items of the web page.

6. The system of claim 1, wherein the placeholders representing the suppressed items of the temporary web page are displayed in the same order as corresponding portions of the web page.

7. A method for editing a group-editable web page, comprising:
    providing to a user, a web page having a control panel that lists names of all templates currently in use on the web page and for each template displaying a number of items associated with that template;
    parsing the web page;
    receiving a selection of suppressed items from the user and replacing each of the suppressed items with a placeholder identification in a temporary web page;
    identifying items not suppressed in the web page, wherein each of the non-suppressed items is associated with an edit area in a further temporary web page;
    receiving edits from the user in one or more of the edit areas in the further temporary web page;
    receiving a selection of one of the templates in the control panel from the user and providing a further web page to the user comprising a dialog box for editing the selected template;
    receiving edits to the selected template; and
    merging the edits of the temporary web page, the further temporary web page, and the further web page into the web page.

8. The method of claim 7, wherein the replacing accounts for one or more edits by other users.

9. The method of claim 7, further comprising:
    editing formatting characteristics of the web page, wherein the formatting characteristics comprise at least one of text, images, and formatting codes editable by one or more authorized users, and wherein the formatting characteristics are distinct from editable content items of the web page.

10. The method of claim 7, wherein the placeholders representing the suppressed items of the temporary web page are displayed in the same order as corresponding portions of the web page.

11. A non-transitory computer readable medium including one or more computer-readable instructions embedded therein, which when executed by a processor, cause the processor to perform the steps of:
    providing to a user, a web page having a control panel that lists names of all templates currently in use on the web page and for each template, displaying a number of items associated with that template;
    parsing the web page;
    receiving a selection of suppressed items from the user and replacing each of the suppressed items with a placeholder identification in a temporary web page;
    identifying items not suppressed in the web page, wherein each of the non-suppressed items is associated with an edit area in a further temporary web page;
    receiving edits from the user in one or more of the edit areas in the further temporary web page;
    receiving a selection of one of the templates in the control panel from the user and providing a further web page to the user comprising a dialog box for editing the selected template;
    receiving edits to the selected template; and
    merging the edits of the temporary web page, the further temporary web page, and the further web page into the web page.

12. The non-transitory computer readable medium of claim 11, wherein the replacing accounts for one or more edits by other users.

13. The non-transitory computer readable medium of claim 11, further comprising instructions for updating another portion of the web page.

14. The non-transitory computer readable medium of claim 11, further comprising:
    instructions for unlocking the web page; and
    instructions for processing any user contributions stored in a queue.

15. The non-transitory computer readable medium of claim 11, further comprising instructions for replacing one or more of the suppressed items with the placeholders.

16. The non-transitory computer readable medium of claim 11, wherein the formatting characteristics comprise at least one of text, images, and formatting codes editable by one or more authorized users, and wherein the formatting characteristics are distinct from editable content items of the web page.

17. A method for editing a web page, comprising:
- receiving a request from a user to edit formatting of a web page having a control panel that lists names of all templates currently in use on the web page and for each template, displaying a number of items associated with that template;
- prompting the user to select at least one of an item and template content in the web page to be suppressed and receiving a selection of one or more of the items or template content to be suppressed;
- parsing the web page and replacing each of the selected items or template content to be suppressed with a placeholder in a temporary web page;
- defining an edit area for each portion of the web page that is not represented by the placeholders in a further temporary web page;
- receiving edits from the user in at least one of the edit areas of the further temporary web page;
- receiving a selection of one of the templates in the control panel from the user and providing a further web page to the user comprising a dialog box for editing the selected template;
- receiving edits to the selected template;
- determining that the web page is unlocked and locating old edit areas corresponding to the edit areas of the temporary web page, the further temporary web page, or the further web page that received edits; and
- replacing content in the old edit areas with the received edits and entering the edits.

* * * * *